United States Patent
Levy et al.

(10) Patent No.: US 7,182,411 B2
(45) Date of Patent: Feb. 27, 2007

(54) PNEUMATIC-BASED COMMUNICATIONS SYSTEM

(75) Inventors: Fred Levy, Malabar, FL (US); Lonnie Jaynes, Melbourne, FL (US)

(73) Assignee: General Electric Company, Schenectady, NY (US)

(*) Notice: Subject to any disclaimer, the term of this patent is extended or adjusted under 35 U.S.C. 154(b) by 843 days.

(21) Appl. No.: 10/105,645

(22) Filed: Mar. 25, 2002

(65) Prior Publication Data

US 2002/0153765 A1    Oct. 24, 2002

Related U.S. Application Data

(60) Provisional application No. 60/278,203, filed on Mar. 23, 2001.

(51) Int. Cl.
*B60T 8/18* (2006.01)

(52) U.S. Cl. .............. 303/22.6; 701/70; 303/22.1

(58) Field of Classification Search .............. 303/22.6, 303/7, 20, 9, 15, 22.1, 22.3; 701/70, 71, 701/20
See application file for complete search history.

(56) References Cited

U.S. PATENT DOCUMENTS

| | | | | |
|---|---|---|---|---|
| 4,066,299 A | * | 1/1978 | Clements | ............... 303/20 |
| 4,641,892 A | * | 2/1987 | Schmid | ............... 303/47 |
| 4,796,699 A | | 1/1989 | Upchurch | |
| 4,847,770 A | * | 7/1989 | Kane et al. | ............... 701/20 |
| 4,856,595 A | | 8/1989 | Upchurch | |
| 5,651,517 A | | 7/1997 | Stevens et al. | |
| 5,986,579 A | | 11/1999 | Halvorson | |
| 6,114,974 A | | 9/2000 | Halvorson | |
| 6,189,980 B1 | * | 2/2001 | Kull | ............... 303/7 |
| 6,275,165 B1 | * | 8/2001 | Bezos | ............... 303/7 |

* cited by examiner

*Primary Examiner*—Melanie Torres
(74) *Attorney, Agent, or Firm*—John L. DeAngelis; Beusse Wolter Sanks Mora & Maire, P.A.; Carlos L. Hanze, Esquire

(57) ABSTRACT

An apparatus for communicating information over a pressurized fluid-carrying pipe connecting a plurality of serial nodes. A sounder node (i.e., transmitter) creates variable pressure patterns within the fluid-carrying pipe, which pressure patterns are identified and detected by other nodes. The patterns convey information or solicit responses from the receiving nodes. The receiving nodes reply to the pressure fluctuations by inducing reply pressure fluctuations in the fluid-carrying pipe or by communicating with the sounder node via a separate radio frequency communications system. The apparatus and method can be used as an information-carrying communications medium or a train linking methodology for a railroad train.

47 Claims, 6 Drawing Sheets

PNEUMATIC-BASED COMMUNICATIONS SYSTEM

RELATED APPLICATIONS

This application claims the benefit of U.S. Provisional Application No. 60/278,203 filed on Mar. 23, 2001.

BACKGROUND OF THE INVENTION

The present invention is related generally to systems and methods for communicating with nodes in a linear network linked by a fluid carrying channel or pipe, and in particular to such a system and method for communicating among and controlling a plurality of railroad cars in a train, where the railroad cars comprises a linear network.

For many years, railroad freight trains have operated with pneumatic brakes for braking the locomotive and the individual railcars. In a typical system, the locomotive supplies pressurized air to the railcars (specifically, to a railcar reservoir within each railcar) through a brake pipe extending the length of the train. The brake pipe of each railcar is serially connected to the brake pipe of the adjacent railcars via a flexible hose connector, sometimes referred to as a glad hand. At each railcar, a control valve responds to the brake pipe pressure for applying or releasing brake shoes against the individual railcar wheels. The brake pipe therefore serves to both supply the pressurized air to each railcar for driving the brake cylinders, thereby applying the brake shoes against the railcar wheels, and also as the medium for communicating brake application and release instructions to each railcar. In a typical prior art pneumatic brake system, the locomotive operator commands the railcars to apply their air brakes by creating a pressure drop of approximately seven to nine pounds in the brake pipe. Each railcar senses the drop in air pressure as it propagates along the brake pipe and supplies pressurized air from the local railcar reservoir to the wheel brake cylinders. The brake pressure applied to the railcar wheels is proportional to the change in the brake pipe pressure in the brake pipe. To release the brakes, the operator increases the pressure in the brake pipe, which is interpreted by the individual railcars as a command to release the brakes.

FIG. 1 illustrates a typical prior art brake system employed by a railroad freight train. A train brake system 202 comprises a locomotive brake system located on a locomotive 100 and a car brake system located on one or more railcars, illustrated by a car 200. The application and release of braking action is controlled by an operator within the locomotive 100. The locomotive 100 contains an air brake control system 102, including a controllably pressurized brake pipe 101 extending the length of the train, through which pressurized air and brake instructions are supplied to each of the cars 200. The brake control system 102 also includes an air supply input 111 for supplying, fluid (air) under pressure to charge the brake pipe 101. Ultimately, as will be explained further below, the air brake control system 102 controls the operation of the pneumatic-operated brake shoes 233 at each of the wheels 235 of the car 200.

Outside air is supplied via an air supply link 111 to an input port 121 of a relay valve 117. A bi-directional port 122 of the relay valve 121 is coupled to the brake pipe 101 via a link 109. The relay valve 117 further includes a port 123 coupled through an air pressure control link 103 to an equalizing reservoir 105. The pressure control link 103 is also connected to a pressure control valve 107 through which the equalizing reservoir 105 is charged and discharged during a brake operation. A exhaust port 124 of the relay valve 117 is controllably vented to the atmosphere. Coupled to the brake pipe 101 are various pressure measuring and display devices not germane to the present invention, and therefore not shown in FIG. 1.

The components of the railcar air brake control system 202 include a control valve 203 having a port 221 coupled to the brake pipe 101. The control valve 203 also includes the port 222 coupled to a pressure storage and reference reservoir 205. Finally, the control valve 203 includes a port 223 coupled to the air brake cylinder 231 for controlling the movement of the brake shoe 233 against the wheels 235 of the car 200. The brake system is initially pressurized by operation of the pressure control valve 107, which controls the air supply to the control link 103 so as to fully charge the equalizing reservoir 105. The relay valve 117 is then operated to couple the port 121 with the port 122 so that air is supplied therethrough to the brake pipe 101 charging the brake pipe fluid path to the predetermined charging pressure. This pressure (typically 72 psi) is established by the pressure of the equalizing reservoir 105 in the locomotive 100. Specifically, when the pressure at the port 122 matches the pressure at the port 123 the brake pipe is fully charged. Through the operation of the control valves 203 in each car 200, the pressure storage and reference reservoir 205 in each car 200 is fully charged to establish a reference pressure at the railcar 200.

When the locomotive operator desires to apply brakes to the wheels 235 of the railcars 200, he operates the pressure control valve 107, typically via a hand-operated control valve lever, causing a partial venting of the air pressure control link 103 and thereby a reduction in the pressure within the equalizing reservoir 105. This reduced pressure in the equalizing reservoir 105 is sensed by the relay valve 117 at the port 123. In turn, this causes the bi-directional port 122 to be coupled to the exhaust port 124, exhausting the brake pipe 101 to the atmosphere until the pressure within the brake pipe 101 equals the pressure of the equalizing reservoir 105.

As the pressure in the brake pipe 101 drops, the control valves 203 in each of the cars 200 senses the pressure reduction by comparison to the pressure in the pressure storage and reference reservoir 205. Since the pressure in the brake pipe 101 is less than the pressure in the pressure storage and reference reservoir 205, there is a corresponding increase in the pressure applied to the brake cylinders 231 from the port 233, resulting in an application of the brake shoes 233 against the wheels 235 in proportion to the sensed pressure reduction. Further pressure reductions in the equalizing reservoir 105, under control of the operator, produce corresponding pressure reductions in the brake pipe 101, and thereby the application of additional braking effort by the brake shoes 233 in each of the cars 200. In summary, the intended operation of the brake system in the cars 200, and specifically the braking effort applied at each of the cars 200, is proportional to the reduction of pressure in the equalizing reservoir 105.

To release the train car brakes, the operator operates the pressure control unit 107 to effectuate a recharging of the air brake control system 102. This is accomplished by bringing the pressure within the equalizing reservoir 105 back to its fully charged state as described above. With the equalizing reservoir 105 recharged, there is again a pressure differential (but opposite in sign to the previous pressure drop) between the ports 122 and 123 of the relay valve 117. This increase in pressure is sensed by the control valves 203 in each of the railcars 200, and in response the brake shoes 233 are released by the action of the brake cylinders 231.

The foregoing described pneumatic braking system has been used for many years and has the advantage of being entirely pneumatic. Such systems however are known to have certain disadvantages. For example, because the brake command signal (either an increase or decrease in air pressure) is a pneumatic signal, it must be propagated along the brake pipe. Accordingly, on long trains it can take many seconds for the brake application or release signal to propagate to the end of the train. Thus, during the propagation interval not all the cars in the train are braking or releasing. Generally, the braking signal propagates much slower than the speed of sound and therefore may require over one minute to propagate along a train of 150 cars. Because the applied braking force is a function of the pressure change detected at each railcar, the precision to which the brake application can be controlled is degraded both by the propagation characteristics of the brake pipe and leakage in the closed pneumatic brake pipe system. Further, in a typical prior art pneumatic braking system, there is no provision for partially releasing the brakes. Once the brake release signal is received via the brake pipe, each railcar fully releases its brakes. In some situations, it would be desirable for the train operator to affect only a partial release, such as when excessive braking has been applied, but it is desired to reduce the level of braking without fully releasing the brakes. The ability to partially release the brakes provides the train operator with improved and more precise control over train operation. Also, most prior art railway braking systems do not provide braking pressure variability among the railcars. Generally, all railcars apply the same braking force based on the sensed brake pipe pressure. But, some railcars will decelerate faster than others, e.g., empty cars decelerate faster than loaded railcars. The differential railcar deceleration rates generate considerable forces (called "slack action") between the railcars and imposes extraordinary stresses on the car draft gear and coupler. The intra-train forces generated by these variable effects require that train operators brake the train judiciously, at a deceleration rate less than what might otherwise be desirable, solely to avoid these forces and the possibility of uncouplings, broken couplers (resulting in increased maintenance) and derailments.

Certain railcars include a retainer valve for imposing a partial brake release condition. The valve, when manually activated, retains some brake pressure in the brake cylinder even though the main brake valve is in a released state.

During the last several years, electronic-based improvements have been introduced to railway power and braking systems. For example, a system is available to provide communications between multiple locomotives located remote from each other in the train consist, so that a single train operator controls the throttle and locomotive brakes of the head-end and the remote locomotives. The system utilizes a radio frequency (RF) link between the lead locomotive (also referred to as the head end unit) and the remote locomotives to provide throttle and brake control. This system provides more even pulling of the railcars and improved locomotive braking performance, because each locomotive generates a pneumatic brake instruction in response to the received RF communication signal (which travels at the speed of light) from the lead locomotive, rather than from the slower brake signal conveyed along the pneumatic brake pipe. Since the brake instructions are generated nearly simultaneously at each locomotive on the train, the railcars receive the brake instruction earlier, as compared to a completely pneumatic system, relying solely on the brake pipe for propagation of the braking signal.

In recent years, the American Association of Railroads (AAR) and certain individual railroads have investigated the use of electronically controlled pneumatic (ECP) brake systems. Such systems typically provide brake commands via the propagation of an electrical signal over a wire extending the length of the train or via a radio frequency system operative between RF transceivers on the locomotive and on each railcar. The primary benefit of these ECP brake systems is the ability to activate the brakes on each car of the train using a signal that propagates at the speed of light. Thus the ECP brake systems allow for the nearly instantaneous activation of railcar brakes along the entire train.

Although wire-based ECP systems provide the benefit of braking signal propagation at the speed of light, the wires that carry the braking signals from car to car are subject to harsh environments and are therefore susceptible to damage. Each railcar glad hand includes an electrical connector for mating with the connector of the next railcar in the train consist to provide a continuous electrical path along the train. If a break or discontinuity develops in the wire, an emergency brake application is automatically initiated and train movement is halted until the break is found and repaired.

In lieu of a wire-based communication system, certain ECP braking systems send brake application and release commands via a radio frequency link to each railcar, where each railcar includes a transceiver for receiving the RF signal, forming a node in a linear token-based communications network. In one embodiment, synchronous communications in the form of a multi-hop network is employed to send a token outbound and inbound on the train consist. This network, once established, provides commands and receives status information from all the nodes (i.e., locomotives and railcars) in the network. Any remaining time/bandwidth network resources, when not in use by the ECP braking system, is available for other network clients such as providing distributed power commands or reports from railcar sensors. The hopping methodology transmits the command repeatedly to the nearest neighbor railcar as it leapfrogs toward its destination, that is, the end of the train or the front of the train. In practice, the network has been demonstrated to be very robust in its application to provide wireless command, control and status for train braking and other train systems.

However, train operation occasionally places certain nodes out of communication with other nodes. For example, as the train passes through a tunnel, certain nodes will be unable to communicate with others. Man-made obstructions in urban environments occasionally block the line-of-sight required for radio frequency communications between the head-end unit (i.e., locomotive) and distant nodes (i.e., railcars). Natural objects, such as mountains, may also be interposed in the line of sight. Thus it is not always possible to guarantee continuous radio frequency communications between all the cars in a railroad train.

Notwithstanding the difficult RF environment in which a train operates, certain classes of network signal protocols may require a high degree of network reliability. Messages may need to be received by all the nodes to affect certain actions at each node. For example, if a radio frequency communication system transmits braking commands from a locomotive to other locomotives or railcars within a train, it is critical that the commands be rapidly and reliably communicated to the destination nodes. In one protocol, receipt of such messages is confirmed by transmitting an acknowledgement signal from the receiving node back to the sending node. However, in the linear network topology of a train, where certain nodes may have an inadequate radiated power, and where the RF environment is constantly in flux, the receiving node may not be able to successfully send an acknowledgement message back to the sending node. Upon failing to receive an acknowledgment signal, the sending node resends the command, resulting in the unnecessary reuse of the available messaging bandwidth.

Also, mobile linear networks, such as a railroad train, present problems not encountered with a fixed network topology. For example, if a train encounters other trains as it moves along a track, the radio frequency signals from the two trains may interfere, preventing signals from the sending unit of the first train from reaching the railcars of the first train. Also, in those situations where similar or identical communications systems are used on each train, RF signals transmitted by the sending node of the first train and received by a railcar of the second train can cause unintended operations at the second railcar, for example, a brake application. Thus, the dynamic nature of this nodal RF communications environment presents certain disadvantages to reliable RF communications among the nodes of the train.

Certain train operations require that the train railcars be linked or ordered. To "link" the train, the head end unit (typically the locomotive) contacts each railcar and receives a response signal, which serves to order the cars in the train consist. Another objective of the linking process is to test the continuity of the brake pipe.

The simplest prior art technique for accomplishing train linking is the manual inspection and recording, in order, of each railcar number in the train. With trains extending over a mile and a half in length, this can be a burdensome and time-consuming task. Also, a manual list is prone to errors and missing a car in the train consist or incorrectly ordering the cars is more likely to occur during the ordering process for a long train. Another linking technique is initiated by sending a radio frequency signal from the head end unit, where the signal instructs each of the railcars to watch for a brake pipe pressure change, A pressure actuator in the locomotive creates the brake pipe pressure change and it propagates down the railcars. As each railcar detects the pressure change, it responds with a radio frequency signal back to the head end unit. Since the brake pipe pressure change propagates serially along the brake pipe, the RF responses are ordered accordingly and the train is linked. The RF return signal provides information about the railcar, the railcar number, for example, for use in ordering the train cars.

The linking process is especially important for ECP brake systems, (whether the brake signal is carried over a wire or via an RF link). Each railcar has a unique identity and is therefore individually addressable via the ECP communications system. The head end unit (HEU) or master node prompts each individual addressable car for operational and status information, but to take full advantage of this data it is necessary to know the location of the railcar in the train. A railcar manifest list can be used to create a file in the locomotive controller in which each railcar is identified (by railcar number, for example) and ordered.

SUMMARY OF THE INVENTION

In accordance with one aspect of the pneumatic messaging or communications system of the present invention, a plurality of pneumatic pulses, forming a pneumatic pulse pattern or ping pattern, are applied to the brake pipe of a railroad train. The pulses carry information from the transmitting node (also referred to as the sounder node) to one or more receiving units or nodes. Typically the locomotive serves as the sounder node and the railcars are the receiving nodes. However, in one embodiment, pneumatic pulses originating at the locomotive are relayed by intermediate railcar nodes, which serve as both a receiving node and a sounder node, to nodes more distant from the sounder node.

The information carried by the pneumatic pulse pattern can provide a technique for ordering the train railcars (also referred to as a train linking process) and can serve as an in-train communication system for relaying other types of information. Each ping pattern comprises a series of pressure pulses on the train brake pipe, where the information is conveyed by the spacing between consecutive pulses, the pulse width or the pulse amplitude. The pulse amplitude and width may be limited by the physical capabilities, especially the activation duration, of the pneumatic valve that creates the pulses. Pulses are detected at the receiving node (a railcar or the locomotive) by pressure sensors monitoring the brake pipe pressure.

Due to the losses and frequency-dependent dispersive effects suffered by a pulse as it traverses the brake pipe, a matched filter, operating in conjunction with the pressure sensor, is the preferable detection device. The matched filter at the receiving node detects the occurrence of a ping pattern by first analyzing the characteristics of the initial pulse or initial plurality of pulses (e.g., pulse duration, pulse width, leading and lagging edge slopes, time between pulses, energy in the pulse) and comparing these characteristics with known stored values (referred to as a first pulse template), that compensates for the brake pipe propagation effects. If the difference between the known and the received characteristics are less than a predetermined limit, then the matched filter declares the occurrence of a ping pattern. These characteristic differences are then used to build a pulse pattern template for application to subsequent pulses in the ping pattern. Thus the brake pipe propagation effects are compensated in the later pulses so that these pulses can be accurately decoded.

In one embodiment, each railcar includes a matched filter for performing this ping pattern identification and decoding function. However, since the ping pattern pulses change shape as they propagate along the brake pipe, this would require that the matched filter at each railcar have a unique first pulse template based on the expected propagation effects. In one embodiment, the matched filters are thus uniquely configured based on their position in the train.

In yet another embodiment, the ping pattern is transmitted from the head end to a first sounder node group, comprising railcars close to the sounder node. For example, each node group can include five railcars, one of which will serve as a sounder node for transmission of the pulses to the next node group. Typically, the initial ping pattern is transmitted from the locomotive sounder node to the first railcar in the first railcar node group, where the pulse is analyzed as described herein. If the first railcar node determines that the pneumatic pressure variations represent a ping pattern, (based on the template comparison process discussed above) then the first node transmits the pulse pattern to the railcars in the first node group. This is typically accomplished by first decoding the pulses in the pattern, then forming new pressure pulses, representative of the received pulses, on the brake pipe for receiving by the other railcars in the first node group. Thus the first node serves as a pulse regenerator and transmitter. In one embodiment, the last node in the first node group then assumes the role of a sounder node and regenerates and transmits the pulses to the next node group. In this manner, the pulse pattern is transmitted along the length of the train, from one node group to the next.

In one embodiment each sounder node group includes five railcars, with the fifth railcar serving as the sounder node to transmit the pulse pattern to the next node group. In this way, the ping pattern propagation is limited to a length of five railcars and thus the propagation effects are minimized. Advantageously, it is then unnecessary to include a unique ping pattern template at each railcar matched filter. It is only necessary for the template to consider the propagation effects experienced as the pulse travels over five car lengths and thus considerably simplifies the design and operation of the pneumatic pulse pattern communication system.

Whether the pneumatic ping pattern is received and sent in a leap frog fashion by node groups in the train or propagated from the locomotive to each railcar, the ping pattern must be differentiated from brake pipe pressure increases or decreases that represent service and emergency brake commands, or pressure variations that are created by flexure of the glad-hands interconnecting the brake pipe of one railcar to the next railcar or by the movement of the railcars.

Each receiving node (whether a railcar or a locomotive) is equipped with a brake pipe pressure sensor for decoding the brake pipe pressure variations as discussed above. Each sounder node (a locomotive or railcar) is equipped with both a pressure actuator and pressure sensor for creating and detecting the brake pipe ping patterns as discussed above.

Use of the brake pipe as a signaling communications path on the train avoids certain disadvantages associated with a wire-based or radio frequency (RF) signaling systems as discussed above. In another embodiment, the pneumatic signally system works in conjunction with a radio-based system, providing initialization of the communications link and thereby avoiding the ambiguities that may be created when an RF link is utilized to link the train, as the brake pipe medium touches all the railcars in the train consist, and does not include railcars outside the train.

Further, one application of the teachings of the present invention obviates the need for RF communications devices on the train, as all communications between the locomotive and the railcars are carried over the brake pipe. This avoids the possibility that a railcar on an adjacent train might receive and erroneously respond to a signal not intended for it. Also, degradation of the radio frequency link due to man-made and natural objects encountered by the train as it travels along the rails is avoided.

In the prior art, brake pipe pressure supplies not only the brake application command, but also pressurizes the railcar brake reservoirs, which in turn supply the brake shoe pressure to stop the train. Whenever the brake pipe pressure drops below a threshold value, for example, due to a brake application, the railcar reservoir pressure may not be sustained at a sufficiently high pressure to produce an effective brake application. Thus a finite time is required to recharge the brake pipe after a brake application. During this recharge interval, the railcar reservoir pressure may be insufficient to provide an effective brake application. Further, in an emergency braking situation when the prior art systems completely evacuate the brake pipe for immediate brake application, an extended recharge time is required.

Low brake reservoir pressure is avoided by the present invention because relatively small pressure variations (the ping pattern pressure pulses) signal brake applications. Both service brake applications and emergency brake applications can be initiated by a ping pressure pattern according to the present invention. Thus the brake pipe is not exhausted for emergency brake applications and both service and emergency brake applications result in only slight brake pipe pressure reductions. Instead of using the brake pipe pressure to signal a brake application, a specified pneumatic ping pattern is recognized at each railcar and instructs the railcar to immediately apply a predetermined brake pressure to the railcar brakes. In yet another embodiment, the actual brake pressure value (i.e., the amount of braking force to be applied) is included within the information conveyed by the ping pattern, providing the train operator with improved control over the braking process. Since the brake pipe reservoir pressure is not exhausted during braking commands, the reservoir pressure is available for repeated brake applications. Train safety and handling is therefore improved.

As will be discussed further herein below, the present invention also teaches a train linking or ordering process that is faster (less than five minutes in one embodiment), more accurate and more reliable than prior art linking techniques discussed above. Use of the brake pipe communications system to order the train cars also avoids the problem of linking any cars from a nearby train that respond to a linking RF signal, since signals on the brake pipe are received only by railcars within the train. Also, the propagation time of the pneumatic ping pattern along the brake pipe provides a mechanism to estimate the distance between the sounder node and the receiving node.

In yet another embodiment of the present invention, each pneumatic ping pattern may include an address portion and an information portion. The address portion identifies the receiving node or nodes for which the ping pattern is intended. Decoding the information portion affects a control or monitoring action at the receiving railcar. For example, a ping pattern may serve as a command to initiate the train linking process or to apply the brakes. Another ping pattern may command a control unit on the railcar to check the wheel bearing temperature and provide a return signal indicating that temperature to the sounder node. If the information contained within the ping pattern is intended for all railcars of the train, then the address portion is unnecessary.

BRIEF DESCRIPTION OF THE DRAWINGS

The following detailed description of the preferred embodiments can be more easily understood and further advantageous and uses thereof more readily apparent, when considered in conjunction with the following figures in which.

DETAILED DESCRIPTION OF THE INVENTION

Figure 1:
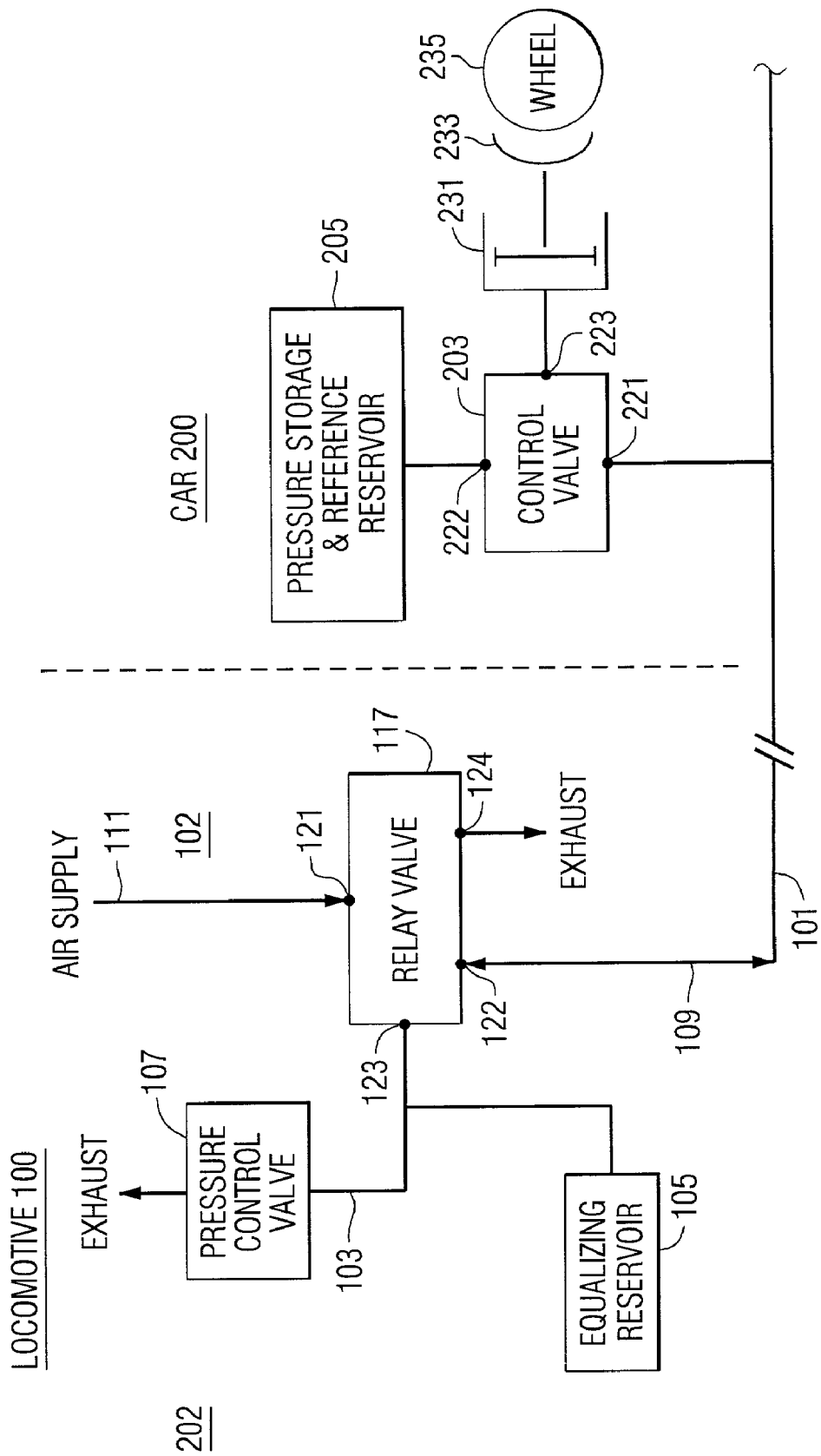
FIG. 1 is a block diagram illustration of a prior art railroad brake control system.

Before describing in detail the particular method and apparatus related to the application of pneumatic pulses on a brake pipe, it should be observed that the present invention resides primarily in a novel combination of processing steps and hardware elements related thereto. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

According to the teachings of the present invention, a set or group of pneumatic pressure pulses are transmitted from the locomotive or head-end unit (the node transmitting the pneumatic ping pattern is also referred to as the sounder or source node) representing a command or instruction for one or more railcars in the train consist. In one embodiment the train is divided into a plurality of node groups and the pressure pulses are transmitted to all railcars within a sounder group by the first car of the sounder group, and then to the next sounder group in the train by the last car in the group.

Pressure pulses are also transmitted back to the locomotive head-end from the rear of the train using the sounder node groups. These response pressure pulses can include a response to a received command or request, an acknowledgement that a command or request has been received and/or implemented or a command to another railcar or to the locomotive head-end. If the information within a ping pattern is intended for a group of railcars or a single railcar, then the ping pattern must be augmented to include an address segment to uniquely identify the receiving railcar(s). In one embodiment, for example, the end-of-train (EOT) device or the highly-visible marker device (HVM), both of which are employed for certain end-of-train functions, may be uniquely addressable to command an operation or extract information therefrom.

The transmitting, receiving and propagating of these pulses along the brake pipe establishes an efficient train communications system operative in several different embodiments. In one embodiment, detection of the ping pattern pulses awakens an RF transceiver in each car to initiate an RF response for linking the train. As discussed above, the pneumatic ping pattern can also command brake-related operations, such as brake release, emergency application, and minimum through full-service brake applications. As discussed above, in one embodiment the pneumatic ping pattern is uniquely addressable to a single railcar (at a cost of increasing the ping pattern packet size and propagation time through the train consist) or to a plurality of railcars, using an address portion of the ping pattern. The pneumatic ping pattern can also initiate the train linking function or certain functions related to the end-of-train devices.

Figure 2:
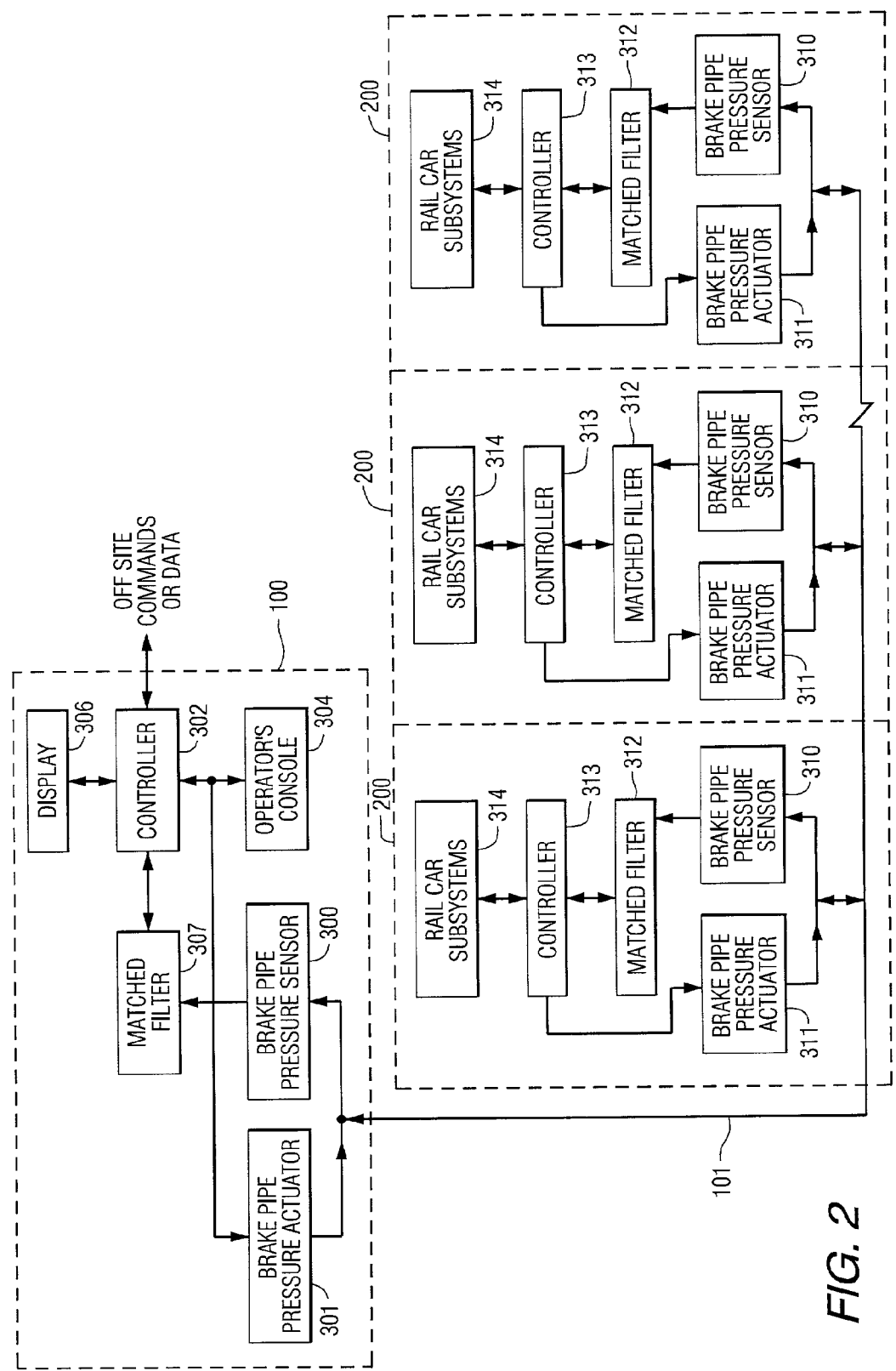
FIG. 2 is a block diagram illustrating the principal components of a pneumatic-based communication system.

FIG. 2 illustrates the principal brake system components as related to the present invention. A brake pipe pressure sensor 300, in the locomotive or head-end unit detects pressure variations on the brake pipe 101 and provides information representative of these detected variations to other components to be discussed below for decoding of the ping pattern. A brake pipe pressure actuator 301 creates the pneumatic ping patterns on the brake pipe 101 in response to one or controllers shown generally by reference character 302. For example, one such controller 302 on the locomotive 100 is the conventional operator brake handle. In one embodiment of the present invention, operator movement of the brake handle at the operator's console 304 causes the brake pipe pressure actuator 301 to create a stream of pulses, i.e., a pneumatic pattern of pressure pulses, also referred to as a ping pattern, in the brake pipe 101. In another embodiment the train operator can manually enter commands to the controller 302 that will generate a pneumatic ping pattern in response.

In one embodiment negative-going pneumatic pressure pulses are formed by either momentarily decreasing the pneumatic pressure (i.e., a negative pulse) through venting of the brake pipe 101 to the atmosphere under control of the pressure control valve 107 which is in turn controlled by the brake pipe actuator 301. A ping pattern can also be formed by making a minimum brake application (i.e., 10 psi reduction) and then momentarily increasing the brake pipe pressure (i.e., a positive pulse) through the application of increased pressure from the equalizing reservoir 105. This initial pressure reduction may be necessary to allow sufficient margin for the subsequent positive pressure pulses. Otherwise the operational pressure limit of the railcar pressure sensors may be exceeded by the positive excursions of the brake pipe pressure.

Further, the controller 302 may also be responsive to automatic timebased commands for checking certain railcar operating characteristics (e.g., wheel-bearing temperature) at predetermined intervals. For example, at predetermined intervals the controller 302 initiates a check of the wheel bearing temperature, which command is input to the brake pipe pressure actuator 301 for signaling each railcar, or specifically identified railcars, via the brake pipe pneumatic ping pattern. The railcar receives and decodes the ping pattern, determines the wheel bearing temperature using an appropriate sensor, and transmits a response pressure pulse pattern representative of the temperature back to the brake pipe pressure sensor 300 for decoding as discussed below.

Another pneumatic pulse pattern transmitted from the locomotive 100 requests information from the end-of-train device, e.g., the end-of-train brake pipe pressure or the condition of the flashing end-of-train light. In another exemplary embodiment, the end-of-train device responds to the pneumatic ping pattern by way of a reply pneumatic pattern generated at the end-of-train device and propagated back to the locomotive 100. Alternatively, the end-of-train device transmits the reply from a RF transceiver at the end-of-train device via a radio frequency link to a RF transceiver at the locomotive 100. In yet another embodiment, the end-of-train device sends a pneumatic ping pattern to an RF transmitter located in the train consist between the locomotive and the end-of-train device. The transmitter includes a pressure sensor for sensing and decoding the pneumatic ping pattern, generating an RF signal representative thereof, and transmitting the RF signal to the locomotive, where RF receiving equipment decodes the reply. Thus by using a combination of the RF and pneumatic ping pattern communications systems, the advantages of each system are exploited. Use of the brake pipe as a communications system ensures that the signal is received by the intended locomotive or other railcar.

The controller 302 can also respond to externally-generated commands and requests, for example from a railroad dispatching center, and in response instruct the brake pipe pressure actuator 301 to create the necessary pneumatic pulse pattern for executing the received request or instruction. Reply ping patterns are decoded as described herein and transmitted back to the off-site location. Certain information generated by or provided to the controller 302 is displayed to the train operator on a display 306.

A matched filter 307 is interposed between the brake pipe pressure sensor 300 and the controller 302. The matched filter 307 has a transfer function representing the brake pipe transmission channel characteristics to provide accurate decoding of the pneumatic pressure pulses. Details of the matched filter 307 are discussed below.

A pressure sensor 310 at each railcar 200 responds to the pneumatic ping patterns transmitted on the brake pipe 101 and in response thereto produces a signal representative of the pneumatic pulses to a matched filter 312. The matched filter 312 (similar in structure to the matched filter 307 in the locomotive 100) analyzes certain characteristics of the first pulse and compares the values to predetermined threshold values. If the difference between the received pulse characteristics and the threshold values is within a predetermined margin, then the pulse is declared to be the first pulse of a pulse ping pattern. The matched filter then also forms a pulse template for use in detecting the remaining pulses in the ping pattern. The template is applied to the remaining pulses to produce modified pulses in which the dispersive affects of the brake pipe channel have been removed.

The information conveyed by the pulse pattern is determined from the modified pulses. One decoding technique involves the use of a look up table where the modified pulse pattern serves as an index into the table, with the table value identifying the information contained within the pressure pulses. For example, one ping pattern commands a service brake application. The matched filter 312 detects the first pulse of the pattern and forms a pattern template based on it. The template information is provided to the controller 313 for use in decoding the remaining pulses. The pulse pattern serves as an index into a look-up table that identifies the command as a service brake application. In response, the controller 313 sends a brake application signal to the brake system 202 (within the collective system referred to generally in FIG. 2 as the railcar subsystems 314) of the railcar 200 and a service brake application is executed.

Because a specific pneumatic ping pattern, rather than a reduction in brake pipe pressure, commands a brake application, the degree of brake application can be controlled through the use of different ping patterns. For example, one ping pattern represents an emergency brake application causing an immediate and maximum-force brake application. Another ping pattern identifies a partial brake application for stopping the train smoothly over a longer distance. Yet another ping pattern can identify a partial brake release. Given the plurality of available ping patterns, the train operator can produce a plurality of braking application and release commands, each producing a predetermined braking force (or release force) driving the brake shoes 233 against the wheels 235 (or partially releasing the shoe 233). The operator can therefore more effectively control the train speed by judiciously choosing the desired brake application or release mode. In the prior art, the braking applications are limited to brakes on, graduated brake application, brakes off and full emergency braking. There is no capability for a graduated brake release Thus, to effectuate smooth braking action in the prior art, the operator modulates the brake application between on and off to bring the train to a smooth stop, a task which is complicated by the train momentum, the varied responses to the brake command at each railcar, and the propagation delay of the brake command through the train.

In addition to serving as a messaging and brake command system, the ping patterns can command monitoring of various railcar parameters, including: the brake pipe pressure, the wheel-bearing temperature, the brake shoe position (e.g., engaged or disengaged), the interior temperature of a refrigerator car, the railcar weight and the presence of an end-of-train (EOT) device. In response to a command received at the railcar 200 to determine the current value of an operating parameter via a unique pneumatic pressure pattern, the parameter is measured using one of many well-known transducers or sensors. A signal representative of the sensed parameter is generated by the appropriate railcar subsystem 314, a representative pressure ping pattern is created by the brake pipe pressure actuator 311 and transmitted over the brake pipe 101. The ping pattern propagates along the brake pipe 101, is detected by the brake pipe pressure sensor 300 in the locomotive 100 and detected and decoded as discussed above. The controller 302 responds by displaying the requested parametric information to the operator on the display 306 and/or transmitting the information offsite from the locomotive 100.

In the examples described heretofore, it is implicitly assumed that each railcar 300 communicates directly with the locomotive 100 via the pneumatic pressure pattern on the brake pipe 101. In an alternative embodiment, intermediate railcars between the ping pattern source and the destination serve as relays for the pneumatic pressure pattern. The pneumatic pressure pattern is received at an intermediate node and decoded by a matched filter. A regenerated pneumatic pressure pattern, substantially identical to the received ping pattern, is created and applied to the brake pipe 101 for propagation to a next relay point in the train consist or directly to the destination. This embodiment is particularly advantageous for long trains where the pneumatic pressure pattern may be severely distorted after propagating for long distances over the brake pipe 101. In one embodiment, for instance, it is expected that about each fifth railcar will be employed as a relay node. Further details of this embodiment are described below.

It is important to recognize that in certain applications of the present invention, and due to safety considerations, the prior art brake application and release instructions may continue to be applied to the brake pipe in addition to the pneumatic pulse patterns of the present invention. Under these circumstances, the various components associated with initiation and decoding of the pneumatic pulse pattern must be capable of distinguishing between a prior art brake application or release command and the pneumatic ping patterns of the present invention. Thus the pneumatic ping pattern comprises multiple pressure pulses created in the brake pipe 101 of the train; the prior art brake application or release comprises a single step function change in brake pipe pressure.

In addition to varying the brake pipe pressure to create the ping pattern, acoustic pulses, buzzes or audio tones can also be transmitted on the brake pipe to serve as a signaling system. Also, pressure pulse pattern can employ pulse position modulation, pulse width modulation, frequency modulation or phase modulation to impart information onto the pulse pattern. A frequency modulation process involving audio tones (or tones outside the range of human hearing) can be created by a multi-tone device such as a pipe whistle, and propagated along the brake pipe 101 Phase modulation can shift the tone phases to represent the information. The brake pipe 101 can also operate as a waveguide and utilize surface acoustic wave devices to provide the matched filter and the actuator functions.

Figure 3:
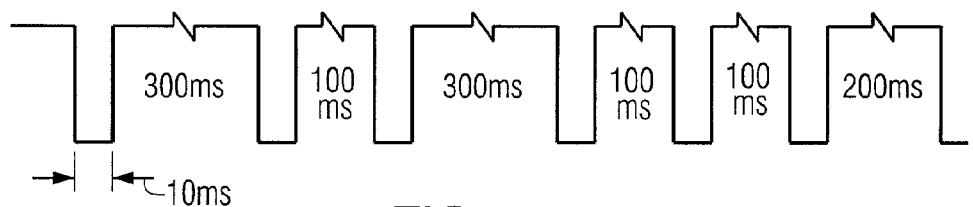
FIGS. 3 and 4 are exemplary ping patterns.
Figure 4:
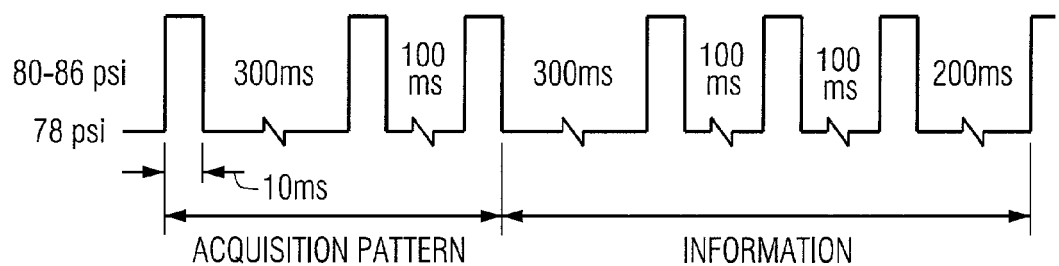

The FIG. 3 and FIG. 4 pneumatic ping patterns have a comb-like feature for detection by the matched filters 307 (in the locomotive 100) and 312 (in the railcars 200). The FIG. 3 pattern illustrates a plurality of ten millisecond negative-going pressure pulses spaced apart at predetermined time intervals to form a pulse-position modulated signal, where the information is conveyed by the position of each pulse, i.e., the time interval between pulses. In one embodiment, each pulse is represented by a brake pipe pressure decrease of ten milliseconds or less in duration; the entire pulse ensemble has a duration of approximately one second. The optimum pulse length and interval between pulses is determined by the response and actuation characteristics of the pressure sensors/actuators 310/311 in the railcars 200, the brake pipe pressure sensor/actuator 300/301 in the locomotive 100 and the brake pipe propagation characteristics. These sensors and actuators must be able to accurately respond to brake pipe pressure fluctuations in the receiving mode and to create the desired pressure variations in the transmit mode. Robust pressure sensors allow the use of shorter pulse durations and closer pulse spacing, allowing the entire pulse ensemble to be propagated along the train consist in less time. In one embodiment, the pulse pressure amplitude is between one and two pounds per square inch below for negative going pulses or above for positive going pulses relative to the nominal brake pipe pressure of 90 psi. Based on current actuator and sensor valve technologies, the pulses can be spaced at intervals from approximately 70 to 300 milliseconds.

A second exemplary positive-directed pulse pattern is illustrated in FIG. 4, where each pulse is implemented by a pressure increase in the brake pipe 101. The nominal brake pipe pressure in this embodiment is 78 psi and the pulse pressure is shown as between 80 and 86 psi. The pressure sensors/actuators 300/301 in the locomotive 100 and 310/311 in the railcars 200 must be able to create and sense this differential pressure for accurate pulse formation and detection; the pressure differential values (i.e., pulse height) and pulse spacing can be modified dependent upon the characteristics of the hardware elements employed.

Note further that FIG. 4 illustrates an embodiment of the present invention with an initial series of pulses presenting an acquisition pattern (e.g., an address of a railcar) and the remaining pulses presenting the information (e.g., a command to carry out a specific operation or to monitor and return a requested operational parameter). Each railcar 100 has a unique assigned address and in this embodiment the acquisition pattern in the pulse ensemble uniquely describes one or more individual railcars for which the information is intended. Typically, in this more complex embodiment, the duration of the acquisition portion plus the information portion of the pneumatic pulse pattern is approximately 1200 milliseconds.

Figure 5A:
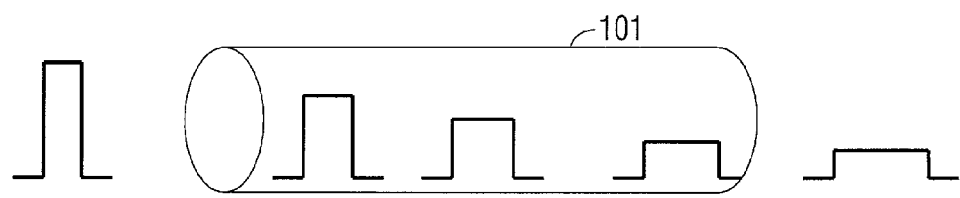
FIG. 5 illustrates the distortion encountered by a pneumatic ping pulse while propagating along the brake pipe.
Figure 5B:
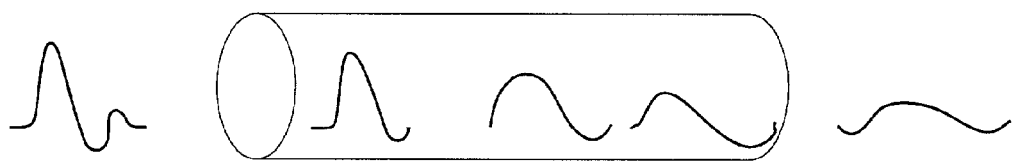

FIGS. 5A and 5B depict the propagation effects suffered by a brake pipe pressure pulse as it travels through the brake pipe. Although, the effects are exaggerated for clarity, the pulse amplitude decreases with propagation distance due to resistances in the brake pipe and the pulse shape broadens due to dispersive effects. FIG. 5A illustrates the effects for an ideal transmitted pulse and FIG. 5B illustrates the effects for a practical pneumatic pulse created on the brake pipe by a sounder node.

As discussed above, in one embodiment of the present invention the matched filters 307 and 312 create a pulse detection template based on the difference between the characteristics of the first received pulse of the ping pattern and the source pulse, the characteristics of which are known a priori by the matched filters 307/312. The received pulse characteristics are affected by the brake pipe resistance, propagation time, frequency dispersive effects and propagation delays. Thus the difference between the received and source pulse characteristics is used to form a template for application to the subsequent pulses of the ping pattern for decoding those latter pulses. The pulse characteristics used to create the template are selected from among one or more of: the energy within each pulse, the average pulse width, the average pulse height, the elapsed time since detection of the first pulse in the pulse ensemble, the ensemble duration and the leading and lagging pulse edge shapes.

Once the detection template is created, the matched filters 307 and 312 apply the template to subsequently received pulses to generate modified received pulses, which are then compared to known ping patterns and declared to be a ping pattern if the characteristics of the modified ping pattern are within a predetermined error margin of a known ping pattern. Each known ping pattern is associated with a predetermined request for information or command to the receiving railcar. For example, if the energy in the first received pulse is x and it is known that the source pulse has an energy of y, then the template adds the difference between x and y to the subsequently received pulses, in this way compensating for the energy dissipated during propagation through the brake pipe 101. Because the propagation distance along the brake pipe affects the received pulse characteristics, the template at each railcar 200 would likely be different.

In another embodiment of the present invention, in lieu of a pulse comparison process using the template, the matched filter transfer function is formulated to account for the propagation effects encountered as the pulse traverses the brake pipe. When the transfer function is applied to a received pulse, the result is a unique output signal that represents the ping pattern as transmitted from the source node. However, with this technique the matched filter on each railcar must be customized based on its location in the train as the transfer function is related to the propagation distance from the sounder node. If the ping pattern pulses are relayed between adjacent nodes or groups of railcars, then the propagation effects are minimized as the propagation distance is limited to the number of railcars in a relay group.

For those railcars near the end of the train, the characteristics of each pulse are also influenced by pulse reflections. Similarly, if there is a blockage in the brake pipe or an angle cock (the valve in the train brake pipe that is opened to create a continuous brake pipe as new railcars are added to the train, and closed as the train is broken up) incorrectly set to the closed position, brake pipe pulse reflections are formed at this point of discontinuity. Thus the pulse characteristics can be analyzed at a railcar to detect characteristics associated with a pulse reflection and in this way a blockage or closed angle cock detected.

Because the brake pipe propagation effects cause the pulse characteristics to change as the pulse travels through the brake pipe, a pulse received at a first railcar can be distinguished from the same pulse received at a second railcar. In another embodiment, the controller 302 at the locomotive 100 includes a brake pipe propagation model that characterizes the pulses. The received pulse characteristics, as determined at the receiving railcars, are provided back to the locomotive 100, via a radio frequency link, for example. By comparing the received characteristics with the propagation model, the controller 302 can correlate the pulse characteristics with the receiving railcar to determine the railcar position along the brake pipe and thus order the railcars. Also, the distance between the locomotive 100 and the responding railcar can be determined using the brake pipe propagation model. Further, as discussed below, a combination of the pneumatic pressure pulses and the RF signal system can also be employed to order the railcars.

Figure 6:
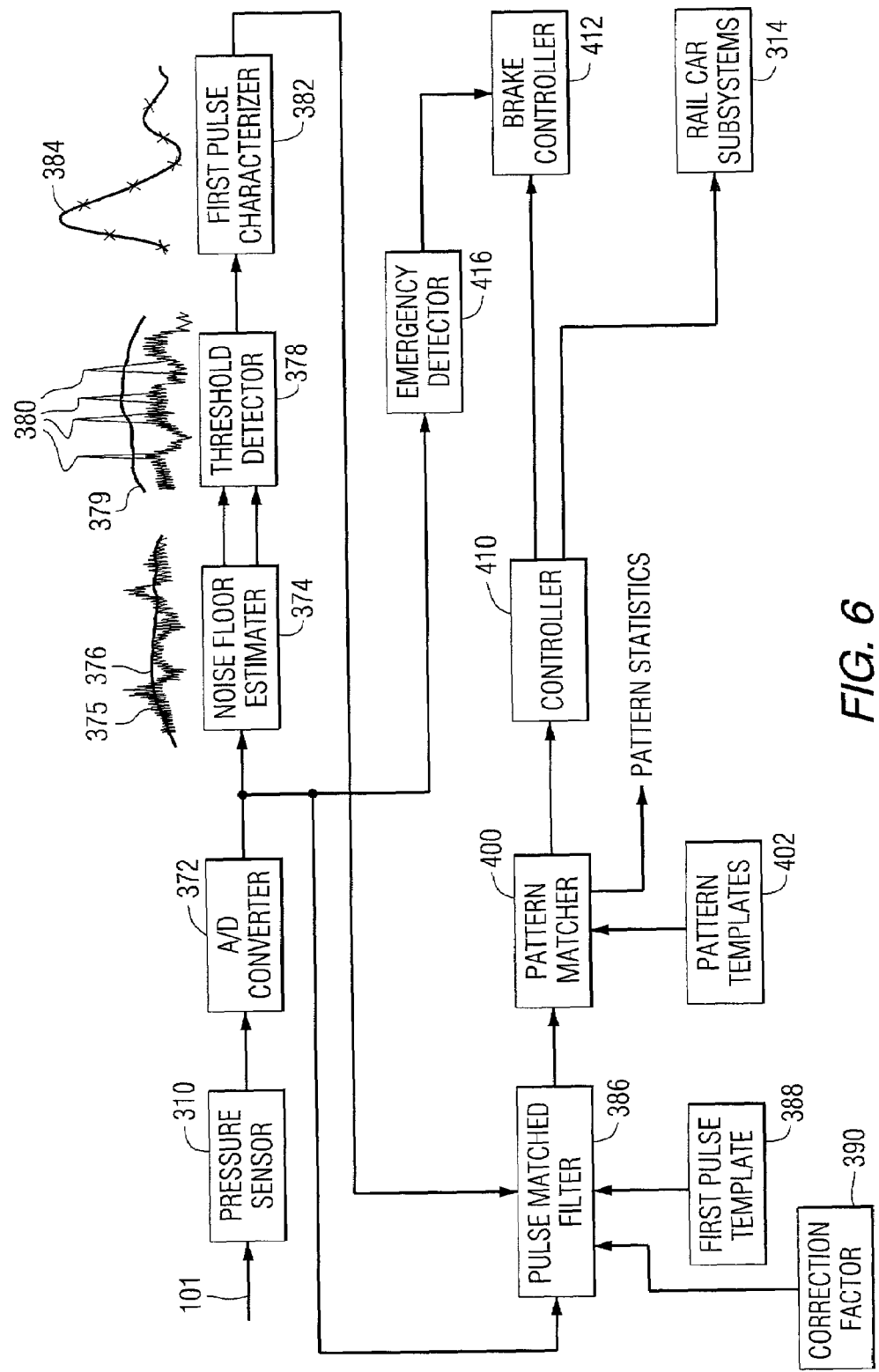
FIG. 6 is a block diagram of a matched filter constructed in accordance with the teachings of the present invention.

FIG. 6 illustrates details of the matched filters 307 and 312 and their associated components. Although, the discussion focuses on the matched filter 312, the matched filter 307 functions in an identical manner and comprises identical hardware and software components. Those skilled in the art recognize that certain elements of the matched filter 312 can be implemented in hardware, software or combination of both.

The matched filters 307 and 312 detect the pneumatic pulse pattern and further must differentiate between a pulse pattern and brake application and release commands for those applications where the railcar brakes are actuated by both ping patterns and by the prior art brake line venting process. The matched filters 307 and 312 must also differentiate between legitimate pulse patterns and random brake pipe pressure variations caused by external factors. Advantageously, according to one embodiment, the ping pattern pulses have a relatively short duration and are therefore less likely to be interpreted as a brake command. However, it is known that the pulse width increases as the pulses travel along the brake pipe.

The break pipe pressure sensor 310 at railcar 200 responds to brake pipe pressure fluctuations and provides an analog signal representative thereof to an analog-to-digital (A/D) converter 372, that samples the input pulse to create a binary bit pattern. In one embodiment, the pulse is sampled at a rate of about 10 MHz. The bit pattern is input to a noise floor estimator 374 for maintaining a running average of the brake pressure variations on the brake pipe 101. To identify the ping pattern, the matched filter 312 must first determine at least one of several pulse characteristics, including the pulse energy, the rise and fall time of the leading and trailing pulse edges, and the occurrence of successive but oppositely-directed pulse slopes within a specified time interval. The matched filter 312 includes the noise floor estimator 374 to estimate the noise floor of brake pipe pressure variations and to establish a threshold detection level. Pressure values below the noise floor are ignored and not considered to be a part of a ping pattern. Pressure values in excess of this threshold are further analyzed to determine whether they match the characteristics of the first pulse in the ping pattern.

The brake pipe pressure variations 375 as a function of time are shown in the waveform above the noise floor estimator 374 in FIG. 6. The pressure values are averaged over time to form an average noise floor waveform 376. the average is a function of time and thus is represented by an average waveform, rather than a single average value. Note that for simplicity, the FIG. 6 waveforms are shown in an analog representation, although, in fact, these signals are represented by binary patterns in the preferred digital implementation. The average noise floor 376 is input to a threshold detector 378 to establish a threshold reference value (or curve) 379 that takes in to account the average noise floor. The brake pipe pressure signal 380 is also input to the threshold detector 378 from the noise floor estimator 374. The waveforms shown above the threshold detector 378 in FIG. 6 illustrate the threshold waveform 379 and a plurality of pressure values 380 in excess of the threshold value 379. The threshold value is established so that brake pipe pressure variations that are not likely to represent ping patterns are ignored by the processing circuitry. Recall that in one embodiment, the pressure pulses are about 70 milliseconds in duration and about 2 psi above or below the nominal brake pipe pressure.

Pressure variations in excess of the threshold value (such as the pressure peaks 380) are further analyzed in a first pulse characterizer 382 for determining whether these pressure variations represent the first pulse in an information-bearing ping pattern.

The first pulse characterizer 382 determines certain pulse characteristics for each pressure pulse in excess of the threshold pressure, including, for example, rise and fall times, pulse energy, and pulse duration. A first such pulse is illustrated above the first pulse characterizer 382 in FIG. 6 and referred to by reference character 384, which is again illustrated in analog form although at this point in the processing chain the first pulse is represented by a string of binary bits. The results of the first pulse characterization process are input to a pulse matched filter 386, where the first pulse template 388 is compared with the first pulse characteristics. Because the first pulse of the ping pattern (and in fact every pulse of the ping pattern) changes shape during propagation through the brake pipe 101, the first pulse template 388 is derived based on the location of the receiving node on the brake pipe 101. For example, the first pulse template for ping pattern pulses received at a receiving node near the sending node has different characteristics than a pulse template more distant from the sending node, as the latter will experience more distortion effects due to the longer propagation distance.

If the first pulse characteristics match the first pulse template 388, within a predetermined margin, then a ping pattern is declared to be propagating down the brake pipe 101. The subsequent pulses of the ping pattern are sensed by the pressure sensor 310 and input to the analog-to-digital converter 372, then input to the matched filter 386. Each of these pulses has suffered propagation distortion effects, and therefore each one must be reformed to remove these effects. Since at this point in the preferred embodiment the pulse characteristics are represented by binary bit patterns it is therefore a matter of modifying the bit patterns to remove the distortion effects. In one embodiment this is accomplished by applying a correction factor 390 to each pulse. Like the first pulse template 388, the correction factor 390 provides the required pulse characteristic differential values to remove the distortion effects.

In another embodiment, in lieu of using the first pulse template 388, the transfer function of the pulse matched filter 386 compensates for pulse distortions due to propagation down the brake pipe 101. The transfer function is applied directly to the pressure signals on the brake pipe 101, so that the output signal from the matched filter 386 closely resembles the ping pattern as transmitted from the source node. Similarly, the subsequent pulses of the ping pattern are processed through the matched filter 386, including the compensating transfer function, to remove the propagation distortion effects.

The compensated bit patterns (i.e., after the propagation effects have been compensated) from the pulse matched filter 386 are input to a pattern matcher 400, which is further responsive to predetermined pulse pattern templates 402. The ping pattern pulses are compared to the pattern templates 402, and the matching pattern determines the command or information conveyed by the ping pattern. This information is provided as an input to a controller 410, which executes in response thereto. In particular, the instruction or information may require the application of the railcar brakes, under control of a brake controller 412 or may involve one of the other railcar subsystems 314, as shown diagrammatically in FIG. 6.

In a train consist that commands brake applications and releases with a brake pipe ping pattern and also commands emergency brake applications by brake pipe venting, an emergency detector 416 is responsive to the output signal from the A/D converter 372. Venting of the brake pipe to cause an emergency brake application is detected by the emergency detector 416, which commands the brake controller 416 to immediately apply the brakes of the railcars at full reservoir pressure. In this embodiment, it may be preferable to exclude a ping pattern commanding emergency brake applications, as the emergency brake applications will be commanded by the brake pipe venting. Disadvantageously, venting of the brake pipe requires about a one-hour recharge time, during which time full brake applications are not available. The use of the ping pattern to signal an emergency brake application does not require a recharge of the brake pipe, and thus there is no time interval during which a full brake application is not available.

The pattern matcher 400 also stores characteristic pattern statistics for the received ping pattern ensemble and each of the individual pulses within that ensemble. This information can be stored for later use or transmitted to the locomotive 100 (through an RF communications system or through a return ping pattern on the brake pipe) for further analysis. In particular, if the propagation characteristics of the brake pipe 101 have changed since the first pulse template was created, the first pulse of the pattern may not be detectable. To avoid this situation, the first pulse template 388 can be modified based on the collected statistics to account for any new brake pipe propagation characteristics.

Use of the ping pattern, in lieu of the prior art system of reducing the brake pipe pressure to signal a brake application, will not significantly reduce the brake pipe pressure and therefore, brake pipe recharging is not generally required. Thus the air pressure in the pressure storage and reference reservoirs 205 (of each car 200) remains at about the full charge pressure so that full pressure is available for brake applications. Although it may be necessary to recharge the reservoirs after several ping pattern are transmitted, this is generally not a condition precedent to a full brake application. The recharging is accomplished by activating the relay valve 117 of the locomotive 100 to repressurize the brake pipe 101, which in turn repressurizes the pressure storage and reference reservoir 205 at each rail car 200.

Further, according to the present invention graduated brake releases are possible through the use of one or more ping patterns instructing the brake controller 412 to reduce the air pressure applied to the rail car brake shoes 233. Also, because an emergency brake application is signaled by a specific ping pattern, rather than evacuation of the brake pipe 101, the brake pipe recharge time after an emergency brake application is significantly reduced.

Figure 7:
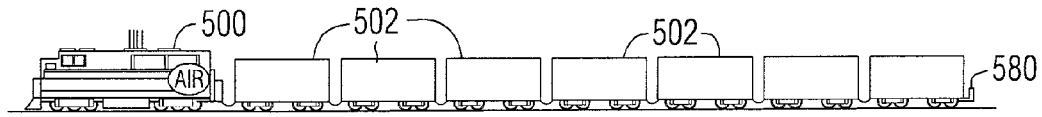
FIG. 7 is a schematic representation of a railroad train to which the teachings of the present invention are applicable.
Figure 8:
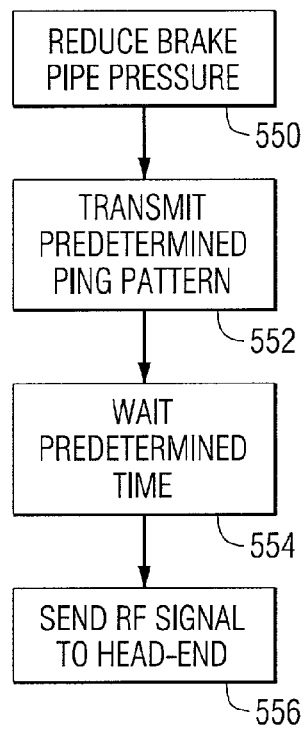
FIG. 8 is a flowchart diagram of the process utilizing a ping pattern to link a train.

The teachings of the present invention can also be applied to the train linking process as described below. FIG. 7 illustrates a locomotive 500 and a plurality of interconnected railcars 502. The locomotive 500 is designated as the sounder node for transmitting the ping pattern. In another embodiment discussed below, the train is segregated into a plurality of sounder groups, with each group having a sounder node. In this embodiment the ping pattern is relayed from one sounder group to the next along the length of the train. It should be observed, however, that once formed, the ping pattern propagates in both directions along the train; it cannot be controlled to propagate in one direction only. The effects of this phenomena will be discussed below. The linking process is also set forth in the FIG. 8 flow chart.

To begin the linking process, at a step 550 the brake pipe pressure is lowered by approximately 15 psi (in one embodiment) from the maximum brake pipe charge value. At a step 552, the sounder node transmits a predetermined pressure ping pattern advising each railcar 502 that the linking process has begun. Each receiving railcar waits a predetermined interval after receiving the ping pattern (as represented by a step 554) then sends a radio frequency signal to the sounder node at a step 556. In one embodiment, each railcar 200 includes a radio frequency transceiver and two spaced-apart antennas, for example, on opposite sides of the railcar 502, for transmitting the RF signal to the sounder node. Two antennas provide communication diversity and minimize the effects of impairment of the radio frequency link. Typically, the radio frequency signal is first transmitted from one antenna on the railcar 502 and then transmitted from the other antenna.

According to the teachings of the present invention, the radio frequency transceiver in the railcars can be powered off, conserving battery power, until "awakened" by the linking pressure ping pattern. Whether the railcar transceivers are powered from a railcar battery or directly using the brake pipe pressure, the use of the present invention to initiate the linking process conserves electrical power at each railcar transceiver.

The RF response signal from each railcar 502 includes some or all of the following information: the width of each pneumatic pulse in the ping pattern, the average pulse width, and the energy in the pulse pattern. Because the pressure pulse characteristics change as the pulses propagate along the brake pipe 101, if each railcar 502 returns information describing the pulse characteristics as received, then, in fact, each railcar 502 has returned unique ping pattern characterization information to the sounder node.

In addition to ordering the railcars, the returned pulse characteristics can identify a blockage in the brake pipe 101, as such an impediment would have a drastic effect on the received pressure pulse characteristics. The use of the pulse characteristic information in the reply RF signal also allows the sounder node to verify that the railcar 502 has responded to a legitimate ping pattern, rather than to unexpected pressure aberrations in the brake pipe 101. Since the RF response is initiated by pneumatic pulses, and not by an RF signal as taught by the prior art, there is no danger that a railcar on another train can participate in the linking process.

In another embodiment of the present invention one or more of the railcars 502 serves as a sounder nodes for relaying pneumatic pulse patterns to other railcars in the train consist. This embodiment is utilized when the propagation characteristics of the brake pipe 101 cause excessive degradation of the pulse signals, thereby preventing accurate pulse detection at railcars distant from the head end unit or sounder node. According to this embodiment, the train consist is divided into a plurality of node groups, where each group comprises n railcars, including an identified sounder node within the group of n railcars. Typically, n is about five. The linking process proceeds by first establishing the order for a set of cars in a sounder node group, then progressively establishing the order for all sounder node groups in the train. As each group is established, the link list for that group is completed and shared with the subsequent sounder node group until the last sounder node group determines that it is at the end of the train. Once the last sounder group is added to the link list, the RF system is free to send the signal token up and down the network of railcars. Upon receipt of the token, each sounder node transmits the link list for its group to the locomotive. Thus the locomotive 500 establishes the railcar order by receiving the data from each sounder node in the train.

Figure 9:
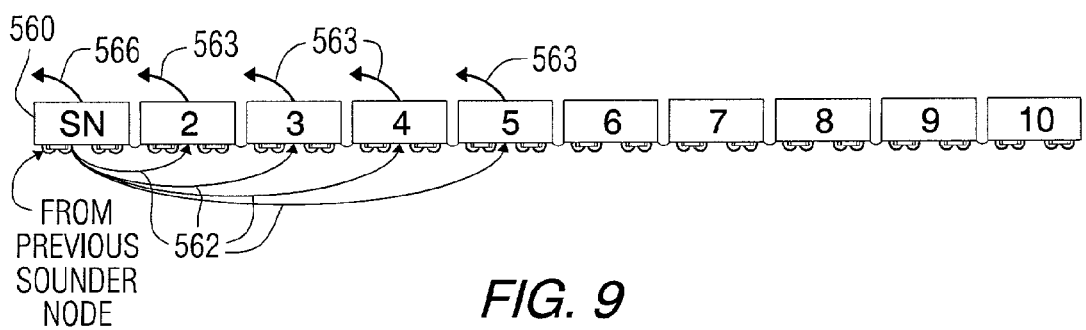
FIG. 9 is a schematic representation of a railroad train illustrating a sounder node group process according to the present invention.

This sounder group process is schematically illustrated in FIG. 9. A ping pattern is received from the head end unit or from the previous sounder node in the train consist, at a sounder node 560. The ping pattern is decoded at the sounder node 560 and retransmitted (as illustrated by arrowheads 562) over the brake pipe 101 to the railcars in the sounder group node, i.e., the railcars labeled 2,3,4 and 5. Each railcar in the sounder group node responds via an RF signal to the sounder node 560 as indicated by arrowheads 563. The last car (number 5) in the group then serves as the sounder node for the next group (railcars 6, 7, 8, 9 and 10) in a similar process. Each sounder node 560 transmits it group order information back to the head end unit either after all railcars in its sounder node group have responded, after all railcars in the train have responded to their respective sounder node or upon receipt of the signal token as described above. The response from the sounder node back to the head end is identified by an arrowhead 566. These responses back to the head end allow the train railcars to be identified and ordered, completing the train linking process. In yet another embodiment where each railcar is equipped with RF signaling equipment, each railcar can respond with an RF signal directly back to the head end unit, circumventing the sounder nodes in the train.

In this embodiment, the sounder node of a sounder node group utilizes the time of receipt of the received RF response signal to identify the railcar occupying each position in the train. That is, if each railcar responds upon receipt of the ping pattern, then the responses will be received by the sounder node in the serial order in which the railcars received the ping pattern, which is the order that the railcars appear in the train. The railcar response to the sounder node includes unique railcar information, such as the car number (for creating the ordered railcar list).

In another embodiment, in response to the ping pattern transmitted from the sounder node, each railcar 502 in the sounder node group transmits a return ping pattern back to its sounder node over the brake pipe 101, rather than the responding with the RF signal discussed above. Like the RF system, the ping pattern response can include a car identification number and other car parametric information, for example, car length and car weight.

In yet another embodiment based on node groups, the head end unit transmits the pneumatic ping pattern to the first five, for example, railcars in the consist. The head end unit then receives a pneumatic pulse reply signal from each of the railcars within the group or an RF response signal. Once all cars in the group have responded, railcar number five becomes the sounder node for transmitting the ping pattern to railcars six through ten. Then railcars six through ten transmit an RF reply signal back to the locomotive 500, after which railcar number ten becomes the sounder node. This process continues until all of the railcars 502 have received a pneumatic ping pattern and responded with an RF response signal.

In the embodiments discussed above, since a ping pattern propagates in both directions along the train, it is likely that a previously linked railcar will see a subsequent pneumatic ping pattern. To avoid the situation where a railcar responds to the receipt of a second pneumatic ping pattern, once a ping pattern has been received and a response RF signal transmitted by the railcar, the receipt of subsequent ping patterns at the railcar does not trigger the transmission of another response signal.

One process for the real time assignment of sounder nodes along the length of the train requires that each railcar measure the pulse energy in one or more pulses of the ping pattern. When the energy drops below a predetermined threshold at a railcar, then that railcar assigns itself as the next sounder node to relay the ping pattern.

As an alternative to the use of an RF reply from each sounder node, the replies can be in the form of a ping pattern from the receiving railcar back to the sounder node. In each of the embodiments discussed above, a sounder node can also respond to the head end unit via an RF signal or via a ping pattern. In the latter case, ping patterns transmitted by a first sounder node are received at a second sounder node, and appended to the ping pattern that the second sounder node transmits to the head end. This technique thus employs a leap frog process, where the ping patterns transmitted from more distant sounder nodes are relayed to the head end by intermediate sounder nodes.

Figure 10:
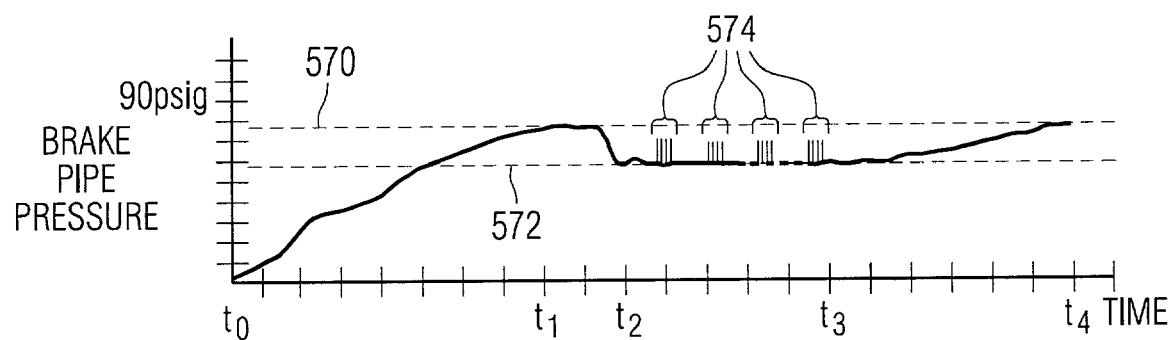
FIG. 10 illustrates exemplary brake pipe pressure variations as a function of time.

FIG. 10 is a graph of the brake pipe pressure over time, illustrating a pneumatic ping pattern. Reference character 570 identifies the steady-state brake pipe charge pressure, sometimes referred to as the yard charge level. The brake pipe must be charged to this value before train movement is permitted and is maintained at this level during train operation, to ensure that the railcar brakes can be safely applied when needed. As shown, at to the brake pipe 101 begins to charge until it reaches the yard charge level 570 at $t_1$. When it is desired to send a ping pattern along the brake pipe 101, at $t_2$ for example, the brake pipe pressure is controllably dropped by a brake application of about 10 psi, initiated by the train operator. In certain circumstances, it may be desirable for the brakes to be applied during the ping pattern propagation, especially if the ping pattern is employed to link the train. The lower brake pipe pressure value is represented by a reference character 572. From this lower value the ping pattern pulses 574 are placed on the brake pipe 101. As discussed above, The ping pattern transmits information to each railcar or serves to initiate the train linking process. In the embodiment where sounder group nodes are employed, the ping pattern pulses 574 are relayed down the train. The ping pattern 574 concludes at $t_3$, after which the brake pipe 101 is charged back to the yard charge pressure 570, reaching that level at $t_4$.

In another embodiment, the ping pattern pulses can be formed by negative-going pulses, i.e., by dropping the pressure from its steady state value to a lower value.

Because cabooses are no longer used on trains, an end of train (EOT) device 580 in FIG. 7 serves several important safety-related functions. Conventionally, the end of train device 580 monitors the brake pipe pressure and provides a flashing warning signal to following trains. According to the teachings of the present invention, a unique ping pattern intended only for the end of train device 580 can be propagated from the locomotive and relayed by intermediate sounder group nodes, as discussed above, to the end of train device 580. This ping pattern includes various instructions or commands. For example, the pulse pattern can instruct the end of train device 580 to measure the brake pipe pressure at the end of the train and transmit this value, via an RF signal or a ping pattern back to the locomotive 500. The instruction can prompt a return signal that advises the condition of the warning flasher or the status of the battery that powers the warning flasher.

Figure 11:
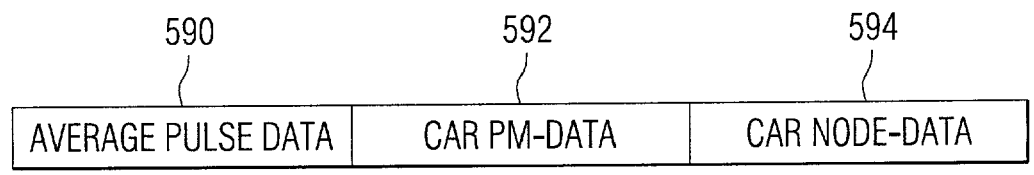
FIG. 11 illustrates the contents of each portion of one embodiment of a brake pipe pneumatic ping pattern.

FIG. 11 illustrates exemplary data blocks contained within a railcar reply message to a ping pattern as described herein. In one embodiment this reply is carried over a radio frequency communications link from the railcar 502 to the train head end unit or locomotive 500. Alternatively, the railcar 502 can respond by way of a pneumatic ping pattern on the brake pipe 101. Of course, the pneumatic reply cannot be transmitted via the brake pipe until all other brake pipe signaling activities have terminated. A first segment 590 of the reply includes information related to the characteristics of the received pulses, in particular, averages of this information can be sent, rather than the absolute data. The pulse data includes pulse width, height and the energy within a pulse. This pulse characterization information can be used for analysis of the brake pipe propagation affects or as train-linking information, as discussed above. A segment 592 includes car personality module (PM) identification data including, for example, car length, weight and other pertinent information that might be useful at the head end unit to identify the railcar. For instance, if the railcar is refrigerated, this information should be provided to the head end unit so that periodic interior temperature checks are requested to ensure the temperature remains within predetermined limits. A segment 594 identifies the node group to which the particular railcar belongs. As discussed above, given the train length and propagation distortions caused as the pulse travels down the brake pipe 101, it is advantageous to perform the train linking process on groups of railcars. In one embodiment, the group size is five railcars and thus each group of five railcars carries a group node identification number, which is included within the segment 594 of the reply message.

While the invention has been described with reference to preferred embodiments, it will be understood by those skilled in the art that various changes may be made and equivalent elements may be substituted for elements thereof without departure from the scope of the invention. In addition, modifications may be made to adapt a particular situation to the teachings of the present invention without departing from the scope thereof. Therefore, it is intended that the invention not be limited to the particular embodiment disclosed as the best mode contemplated for carrying out this invention but that the invention will include all embodiments falling within the scope of the appended claims.

What is claimed is:

1. An apparatus for communicating information between a plurality of serial nodes linked by a fluid-containing enclosure, said apparatus comprising:
   a first fluid pressure transducer in fluid communication with the fluid-containing enclosure at a first one of the plurality of serial nodes;
   a second fluid pressure transducer in fluid communication with the fluid-containing enclosure at a second one of the plurality of serial nodes;
   wherein at least one of said first and said second fluid pressure transducers induces a serial stream of pressure variations in the form of alternating periods of increased pressure and decreased pressure in the fluid-containing enclosure, and wherein another one of said first and said second fluid pressure transducers senses said serial stream of pressure variations in the fluid-containing enclosure; and
   wherein said serial stream of pressure variations propagates through the fluid-containing enclosure, the alternating periods of increased pressure and decreased pressure collectively conveying information between the first one of the plurality of nodes and the second one of the plurality of nodes.

2. The apparatus of claim 1 wherein the pressure variations induced by the first fluid pressure transducer are sensed by the second fluid pressure transducer, and in response thereto the second fluid pressure transducer induces pressure variations in the fluid-containing enclosure for propagation toward a third node of the plurality of serial nodes, and wherein the induced fluid pressure variations are representative of the sensed fluid pressure variations.

3. The apparatus of claim 2 wherein the second node of the plurality of serial nodes is located between the first node and the third node.

4. The apparatus of claim 1 wherein the pressure variations induced by the first fluid pressure transducer at the first node are sensed at each node of the plurality of serial nodes between the first node and the second node, and wherein in response to the sensed fluid pressure variations the second fluid pressure transducer at the second node induces representative pressure variations in the fluid-contain enclosure propagating in a direction away from the first node.

5. The apparatus of claim 1 wherein each serial node comprises a railcar or a locomotive of a railroad train.

6. The apparatus of claim 1 wherein each one of the first and the second pressure transducers comprise a pressure sensor for sensing the fluid pressure variations in the fluid-containing enclosure, and further comprises a pressure actuator for inducing the fluid pressure variations in the fluid-containing enclosure.

7. The apparatus of claim 1 wherein the fluid-containing enclosure includes a railroad train brake pipe.

8. The apparatus of claim 1 wherein the pressure variations are selected from among positive pressure pulses induced by increasing the fluid pressure and negative pressure pulses induced by decreasing the fluid pressure.

9. The apparatus of claim 1 wherein each one of the first and second fluid pressure transducers comprises an element for substantially removing distortions in the pressure variations caused while propagating through the fluid-containing enclosure.

10. The apparatus of claim 9 wherein the element comprises a matched filter having a transfer function, and wherein said matched filter is responsive to the pressure variations, and wherein the transfer function of said matched filter is selected to substantially remove distortions in the pressure variations, and wherein the output signal of said matched filter is compensated pressure variations.

11. The apparatus of claim 9 wherein the element comprises a pulse template responsive to the pressure variations, and wherein said pulse template stores pulse characteristics that include expected propagation distortion effects, and wherein the pressure variations are compared with the pulse characteristics to determine whether the pressure variations convey information.

12. The apparatus of claim 1 wherein the information conveyed by the pressure variations is selected from among a brake application command, a brake release command, and a request for parametric operational information.

13. The apparatus of claim 12 further comprising operational equipment at one of the plurality of serial nodes, wherein the parametric operational information includes information related to the status of said operational equipment.

14. The apparatus of claim 13 wherein the operational equipment is a train railcar, and wherein said railcar further comprises a car body, a cargo area, a brake system and a plurality of wheels attached to said car body the rotation of which is controllable by the brake system, and wherein the information related to the status of the operational equipment includes one or more of the cargo area temperature, the brake system status and the wheel condition.

15. The apparatus of claim 1 wherein the first node of the plurality of serial nodes comprises a transmitting node located at a locomotive of a train and the second node of the plurality of serial nodes comprises a receiving node located at one of a plurality of railcars of said train, wherein the fluid-containing enclosure comprises a pressurized brake pipe connecting said locomotive and said plurality of railcars.

16. The apparatus of claim 1 wherein the first one of the plurality of serial nodes comprises a train locomotive and the second one of the plurality of serial nodes comprises a railcar of the train, and wherein the fluid-containing enclosure comprises a pressurized brake pipe, and wherein said train locomotive and said railcar are in pressurized fluid communication via said pressurized brake pipe, and wherein the pressure variations are transmitted from the locomotive to the railcar, and wherein the information conveyed by the pressure variations includes a brake application command and a brake release command.

17. The apparatus of claim 1 wherein fluid pressure variations comprise an ensemble of pressure pulses, and wherein each ensemble of pressure pulses comprises an address segment and an information segment, and wherein the address segment identifies the receiving node for which the information is intended, and the information segment includes a request or a command directed to the receiving node.

18. The apparatus of claim 1 wherein pressure variations are determined to be an information-bearing pressure variations by comparing selected characteristics of the pressure variations with reference characteristics to determine the difference therebetween, and wherein if the difference is less than a predetermined margin, the pressure variations are determined to be information-bearing pressure variations.

19. The apparatus of claim 18 further comprising a plurality of reference pressure variations each having an associated information message, and wherein the information conveyed by the pressure variations is the information message associated with reference pressure pulse variations most closely matching the pressure variations.

20. The apparatus of claim 18 wherein the selected characteristics are selected from among the individual pulse amplitude, individual pulse width, the average pulse amplitude, the average pulse width, the time between successive pulses, the energy contained within a pulse, and the average and the total energy of the pressure pulse ensemble.

21. The apparatus of claim 1 wherein at least one of the first and the second fluid pressure transducer comprises a pulse detector for determining whether pressure variations are an information bearing pressure pulse ensemble, said pulse detector comprising:
 a noise estimator for determining the noise floor for pressure variations in the fluid-containing enclosure;
 a threshold detector for determining when a pressure variation exceeds a predetermined threshold above the determined noise floor;
 a pulse characterizer for determining characteristics of pressure variations exceeding the threshold;
 a comparator for comparing the pressure variation characteristics with reference characteristics and for declaring the occurrence of a valid pressure pulse ensemble in response thereto.

22. The apparatus of claim 1 wherein a first pressure variation of the serial stream of pressure variations is analyzed to detect a pulse pattern.

23. The apparatus of claim 22 wherein the characteristics of the first pressure variation that are analyzed to detect the pulse pattern are selected from among: duration, rise time, fall time, amplitude, spectral content and energy.

24. The apparatus of claim 22 wherein when analysis of the first pressure variation detects a pulse pattern, one or more subsequent pressure variations of the pulse pattern are analyzed to determine the information.

25. The apparatus of claim 24 further comprising a pattern matcher for comparing characteristics of one or more of the pressure variations within the pulse pattern with a plurality of pressure variation templates wherein each template is associated with an information message.

26. The apparatus of claim 22 further comprising a first and a second radio frequency device at respectively, the first and the second ones of the plurality of serial nodes, wherein in response to the identification of the pulse pattern at the second one of the plurality of serial nodes, said second radio frequency device is activated for bidirectionally communicating with said first radio frequency device.

27. The apparatus of claim 1 wherein the fluid comprises air and wherein the pressure pulses are created by increasing or decreasing the air pressure in the fluid-contained enclosure.

28. An apparatus for identifying and ordering the railcars of a railroad train, said apparatus comprising:
 a pneumatic brake pipe extending from the locomotive to each railcar of the train;
 a locomotive pressure transducer at the locomotive in fluid communication with the brake pipe;
 a radio frequency transceiver on the locomotive;
 a railcar pressure transducer on at least a first one of the plurality of railcars, wherein said railcar pressure transducer is in fluid communication with the brake pipe;
 a radio frequency transceiver at the first one of the plurality of railcars;
 wherein said locomotive pressure transducer creates a serial stream of pneumatic pressure variations in the form of alternating periods of increased pressure and decreased pressure in the brake pipe, which pressure variations are sensed by said railcar pressure transducer, and wherein the pneumatic pressure variations indicate initiation of the railcar identification and ordering process; and
 wherein in response to received pneumatic pressure variations sensed by said railcar pressure transducer, the railcar transceiver transmits a radio frequency signal to the locomotive transceiver for identifying the railcar.

29. The apparatus of claim 28 wherein the radio frequency signal transmitted by a railcar in response to the pneumatic pressure variations includes information representative of the sensed pressure variations.

30. The apparatus of claim 29 wherein the characteristics of the sensed pressure variations include the pressure variation amplitude, the interval between pressure variations and the energy contained within each pressure variation.

31. The apparatus of claim 28 wherein the identified railcars are ordered in the sequence in which they are located in the railroad train as determined by the time of arrival of the received pneumatic pressure variations at a railcar and the subsequent receipt of the radio frequency signal at the locomotive.

32. The apparatus of claim 28 wherein the railcar pressure transducer compares selected characteristics of the pneumatic pressure variations with a plurality of predetermined reference characteristics and in response thereto the railcar transceiver transmits the radio frequency signal.

33. The apparatus of claim 32 wherein the selected characteristics are selected from among the pressure variation amplitude, the average pressure variation amplitude, the time between pressure variations, the energy contained within each pressure variation and the average and the total energy of the pressure pulse ensemble.

34. The apparatus of claim 28 wherein the railcar pressure transducer comprises a detector for detecting the pneumatic pressure variations, said detector comprising:
   a noise estimator for determining the noise floor for pressure variations in the brake pipe;
   a threshold detector for determining when a pressure variation exceeds a predetermined threshold above the determined noise floor;
   a characterizer for determining characteristics of the pneumatic pressure variations of exceeding the threshold; and
   a comparator for comparing the pneumatic pressure variation characteristics with a plurality of reference characteristics and for identifying pneumatic pressure variations indicating initiation of the railcar identification and ordering process.

35. A method for communicating information between first and second nodes linked by a fluid-containing enclosure, said method comprising:
   forming a serial stream of first pressure variations in the form of alternating periods of increased pressure and decreased pressure in the fluid containing enclosure at the first node;
   receiving the first pressure variations at the second node; and
   at the second node, determining the information conveyed by the first pressure variations, by comparison to a plurality of pressure variations from which the first pressure variations are selected.

36. The method of claim 35 wherein second pressure variations are formed in the fluid containing enclosure at the second node in response to the first pressure variations, wherein the second pressure variations propagate toward a third node linked to the first and the second nodes by the fluid-containing enclosure and are representative of the first pressure variations.

37. The method of claim 36 wherein the second node is located between the first node and the third node.

38. The method of claim 35 wherein the first and the second nodes comprise a railcar or a locomotive of a railroad train and the fluid-containing enclosure includes a railroad train brake pipe.

39. The method of claim 35 wherein the first pressure variations are distorted during propagation through the fluid-containing enclosure, and wherein the step of determining the information further comprises overcoming the distortion.

40. A method for identifying and ordering the railcars of a railroad train including a locomotive and a pneumatic brake pipe connecting the locomotive to each railcar, said method comprising:
   forming a first serial stream of pressure variations in the form of alternating periods of increased pressure and decreased pressure in the pneumatic brake pipe at the locomotive;
   receiving the first serial stream of pressure variations at a railcar of the train; and
   in response to the first serial stream of pressure variations, transmitting a response signal.

41. The method of claim 40 wherein the response signal is transmitted to the locomotive by forming a second serial stream of pressure variations in the pneumatic brake pipe.

42. The method of claim 40 wherein the railroad train includes a radio frequency communications system, and wherein the response signal is transmitted from the railcar to the locomotive over the radio frequency communications system.

43. The method of claim 40 wherein the railcars are ordered in the sequence in which they are located in the railroad train as determined by the time of arrival of the first serial stream of pressure variations at a railcar, and wherein the response signal includes time of arrival information.

44. The method of claim 40 further comprising, at the railcar, comparing selected characteristics of the first serial stream of pressure variations with a plurality of predetermined reference characteristics, and in response thereto transmitting the response signal.

45. The method of claim 40 further comprising:
   forming a plurality of railcar groups within the railroad train;
   receiving the first serial stream of pressure variations at the first railcar of each railcar group;
   transmitting representative pressure variations for the first railcar to each railcar in the railcar group;
   sending a railcar response signal from each railcar in the railcar group to the first railcar; and
   in response thereto, sending the response signal from the first railcar of the railcar group.

46. The method of claim 45 wherein the last railcar of a railcar group is the first railcar of the next successive railcar group.

47. The method of claim 40 wherein the railroad train includes an end-of-train device, and wherein the first serial stream of pressure variations are received at the end-of-train device, and wherein the response signal includes end-of-train status information.

* * * * *